(12) United States Patent
Yano et al.

(10) Patent No.: US 7,862,954 B2
(45) Date of Patent: Jan. 4, 2011

(54) FUEL CELL

(75) Inventors: Masaya Yano, Ibaraki (JP); Masakazu Sugimoto, Ibaraki (JP); Takuji Okeyui, Ibaraki (JP); Toshio Araki, Ibaraki (JP)

(73) Assignee: Aquafairy Corporation, Kyoto (JP)

( * ) Notice: Subject to any disclaimer, the term of this patent is extended or adjusted under 35 U.S.C. 154(b) by 1046 days.

(21) Appl. No.: 10/595,748

(22) PCT Filed: Nov. 15, 2004

(86) PCT No.: PCT/JP2004/016953

§ 371 (c)(1),
(2), (4) Date: May 9, 2006

(87) PCT Pub. No.: WO2005/050766

PCT Pub. Date: Jun. 2, 2005

(65) Prior Publication Data

US 2009/0017354 A1    Jan. 15, 2009

(30) Foreign Application Priority Data

Nov. 19, 2003 (JP) ............................. 2003-389053
Nov. 19, 2003 (JP) ............................. 2003-389059
Feb. 12, 2004 (JP) ............................. 2004-035304
Apr. 13, 2004 (JP) ............................. 2004-118083
Jun. 1, 2004 (JP) ............................. 2004-163116

(51) Int. Cl.
*H01M 2/08* (2006.01)
*H01M 2/00* (2006.01)
*H01M 2/02* (2006.01)

(52) U.S. Cl. ........................ 429/511; 429/507; 429/508; 429/163; 429/172

(58) Field of Classification Search .................. 429/34, 429/35, 37, 163, 172
See application file for complete search history.

(56) References Cited

U.S. PATENT DOCUMENTS 5,432,021 A * 7/1995 Wilkinson et al. ............ 429/17

(Continued)

FOREIGN PATENT DOCUMENTS

DE    102 07 743 A1    5/2003

(Continued)

OTHER PUBLICATIONS

"Frontier of Fuel Cell Development" of Mechanical supplement volume, published on Jun. 29, 2001 by Nikkei BP, Chapter 3 PEFC, 3.1 Principles and Characteristics, p. 46 with an English translation of the full test.

(Continued)

*Primary Examiner*—Patrick Ryan
*Assistant Examiner*—Julian Mercado
(74) *Attorney, Agent, or Firm*—Knobbe Martens Olson & Bear LLP

(57) ABSTRACT

The present invention relates to and provides a fuel cell in which sealing can be reliably made for each unit cell, thereby, enabling thinning, facilitating maintenance, and enabling miniaturization and weight reduction, and enabling free shape design. A fuel cell of the present invention is characterized by comprising a sheet-like solid polymer electrolyte 1 and a pair of electrode plates 2, 3 arranged on both sides of the solid polymer electrolyte 1, and further comprising a pair of metallic plates 4, 5 arranged on both sides of the electrode plates 2, 3, and provided flow path grooves 9, and inlets 4c, 5c and outlets communicating with the flow path grooves, wherein the peripheral edges of the metallic plates 4, 5 are mechanically sealed with an insulation material 6 interposed between the metallic plates.

19 Claims, 10 Drawing Sheets

U.S. PATENT DOCUMENTS

| | | | |
|---|---|---|---|
| 6,087,033 A * | 7/2000 | Grune et al. | 429/37 |
| 6,132,895 A * | 10/2000 | Pratt et al. | 429/39 |
| 6,638,656 B2 * | 10/2003 | Bruckner et al. | 429/30 |
| 6,716,550 B1 * | 4/2004 | Kirby | 429/35 |
| 6,777,126 B1 * | 8/2004 | Allen | 429/34 |
| 2002/0015873 A1 * | 2/2002 | Bruckner et al. | 429/30 |
| 2002/0086196 A1 | 7/2002 | Utsunomiya et al. | |
| 2003/0064272 A1 | 4/2003 | Inagaki et al. | |
| 2003/0082429 A1 | 5/2003 | Nishimura et al. | |
| 2003/0157383 A1 | 8/2003 | Takahashi | |
| 2003/0211374 A1 | 11/2003 | Dehne | |
| 2004/0028969 A1 | 2/2004 | Aoto | |
| 2004/0209146 A1 | 10/2004 | Nishimura et al. | |
| 2004/0209149 A1 | 10/2004 | Nishimura et al. | |
| 2006/0147776 A1 | 7/2006 | Sarata et al. | |
| 2006/0210861 A1 | 9/2006 | Nishimura et al. | |
| 2008/0248338 A1 | 10/2008 | Yano et al. | |

FOREIGN PATENT DOCUMENTS

| | | |
|---|---|---|
| DE | 103 04 657 | 9/2003 |
| EP | 1 339 125 | 8/2003 |
| JP | 58-176881 | 10/1983 |
| JP | 5-326037 | 12/1993 |
| JP | 6-168728 | 6/1994 |
| JP | 8-162145 | 6/1996 |
| JP | 8-339785 | 12/1996 |
| JP | 10-055813 | 2/1998 |
| JP | 10-289722 | 10/1998 |
| JP | 2002-175818 A | 6/2002 |
| JP | 2002-373682 | 12/2002 |
| JP | 2003-017144 | 1/2003 |
| JP | 2003-036865 | 2/2003 |
| JP | 2003-173807 | 6/2003 |
| JP | 2003-178776 | 6/2003 |
| JP | 2003-243020 | 8/2003 |
| JP | 2003-257454 | 9/2003 |
| JP | 2003-317756 | 11/2003 |
| JP | 2004-006183 | 1/2004 |
| JP | 2004-79193 A | 3/2004 |
| JP | 2004-111238 | 4/2004 |
| JP | 2004-127711 A | 4/2004 |
| JP | 2004-149394 | 5/2004 |
| JP | 2004-171842 | 6/2004 |
| JP | 2004-172026 | 6/2004 |
| JP | 2004-183681 | 7/2004 |
| JP | 2004-281384 | 10/2004 |
| WO | WO 00/33411 | 6/2000 |
| WO | WO 2004/079845 | 9/2004 |

OTHER PUBLICATIONS

Supplementary European Search Report issued on the corresponding European Patent Application No. 04818885, dated May 19, 2009.

Japanese Office Action issued in the corresponding Japanese Patent Application No. 2003-389053, dated Jun. 22, 2010.

File History of the related U.S. Appl. No. 11/576,677, as of Jul. 30, 2010.

* cited by examiner

[FIG. 1]
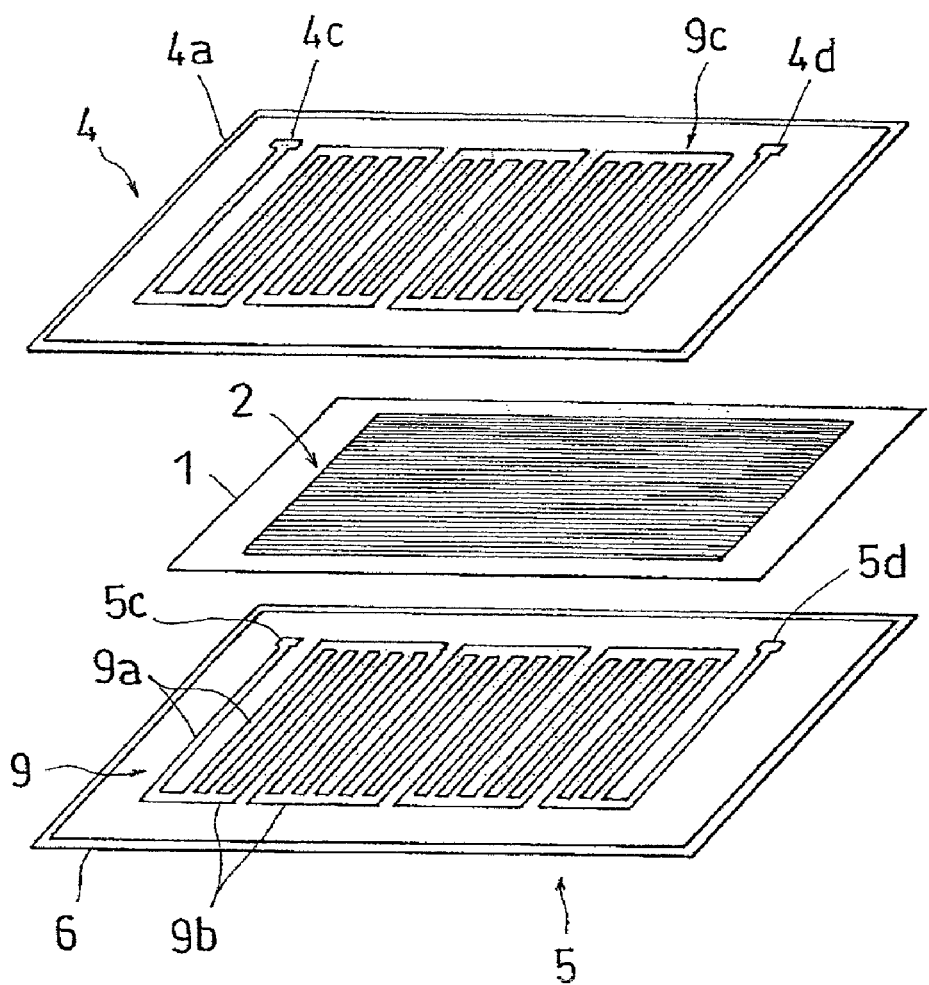
[FIG. 2]
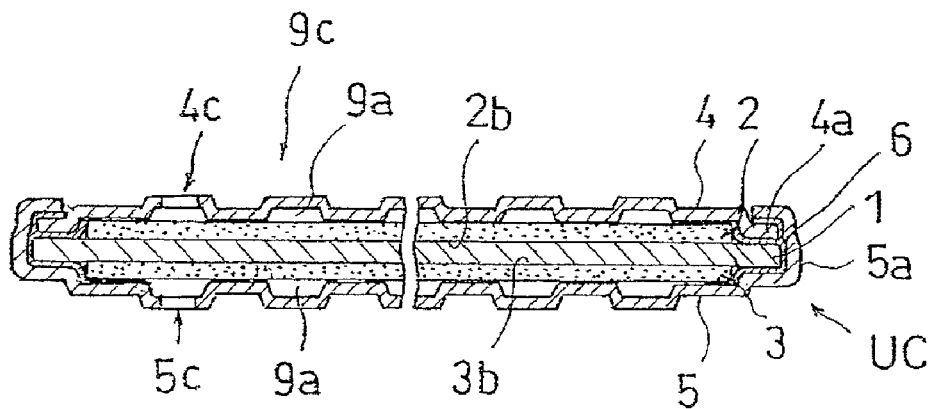

[FIG. 3]
(a)
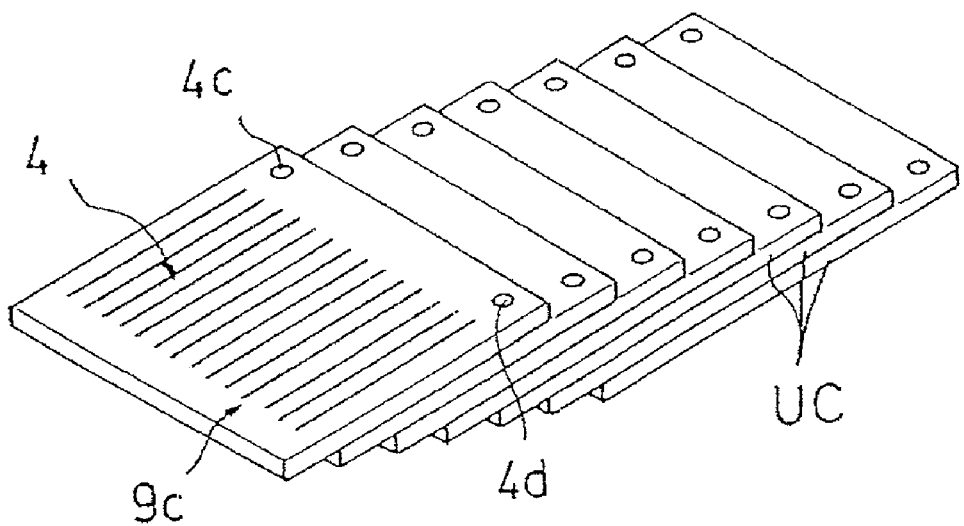
(b)
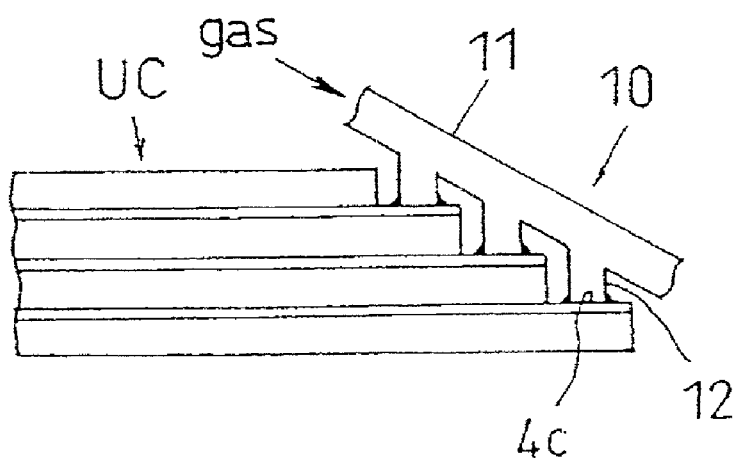

[FIG. 4]
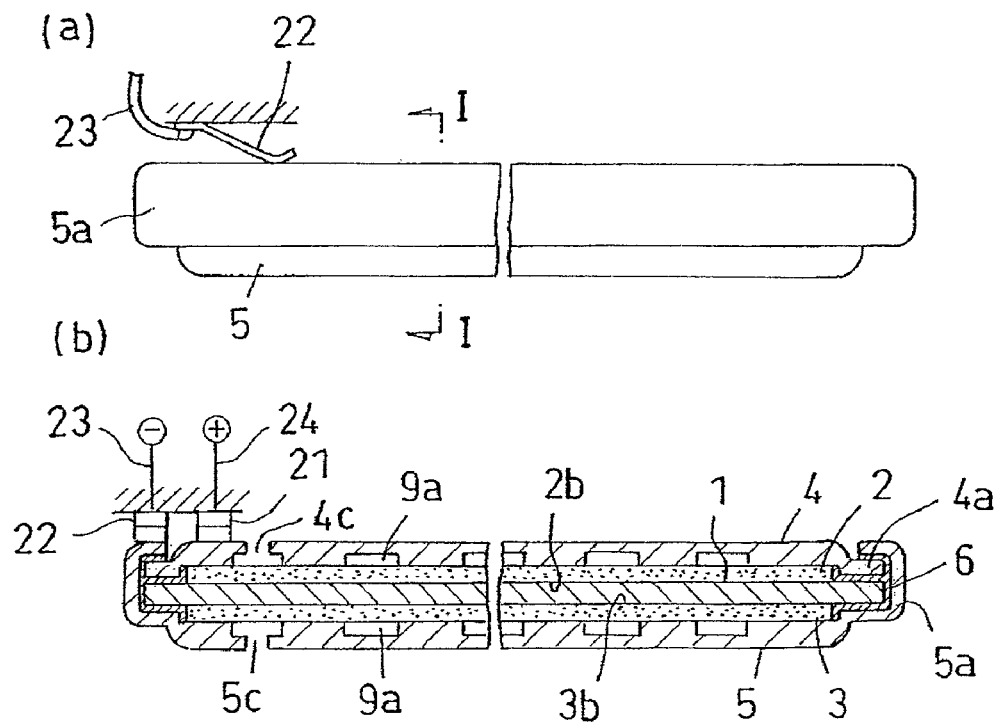
[FIG. 5]
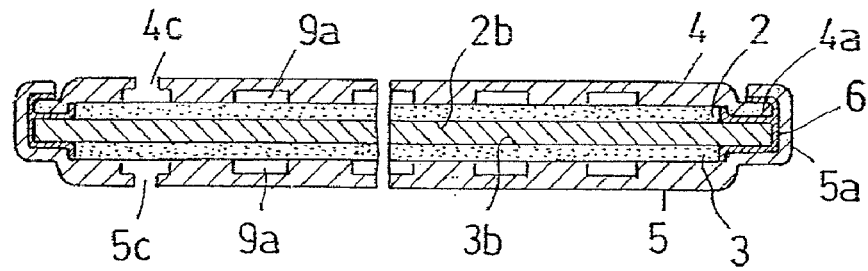

[FIG. 6]
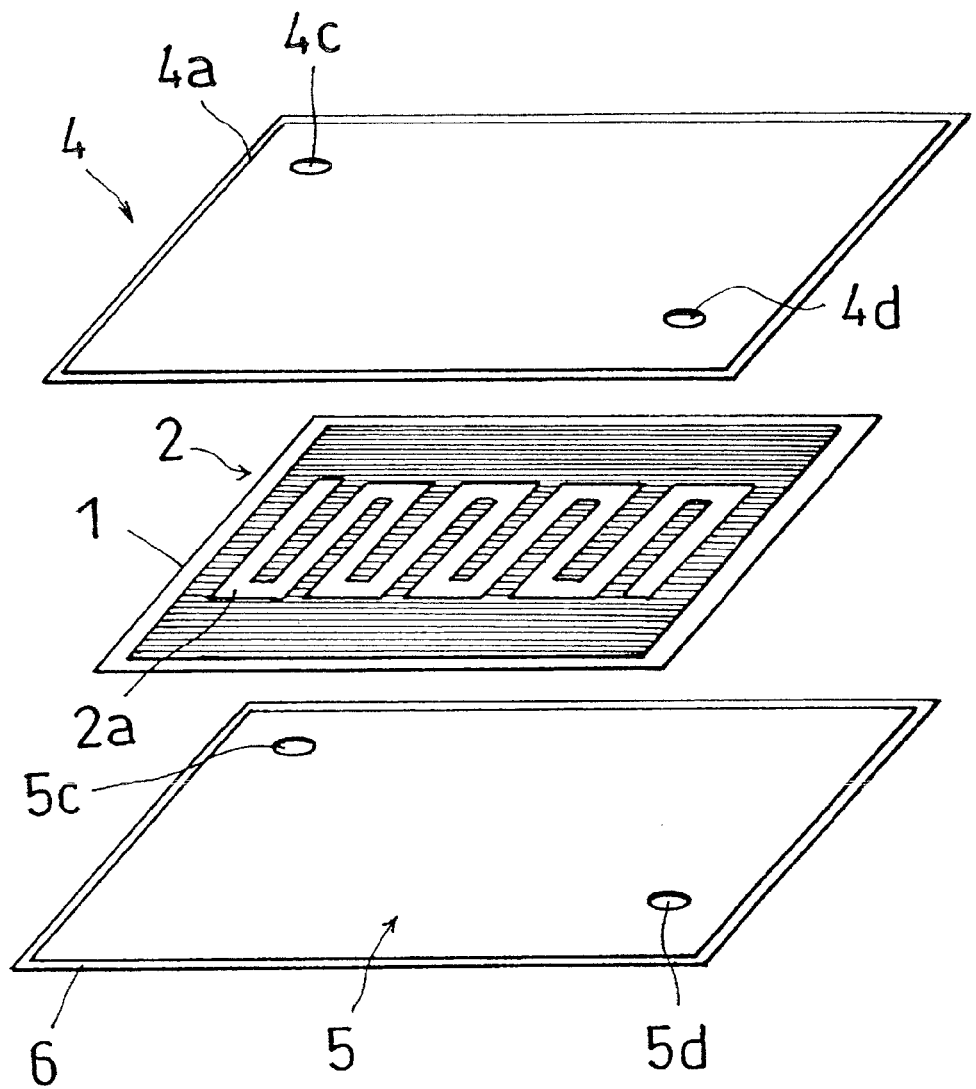
[FIG. 7]
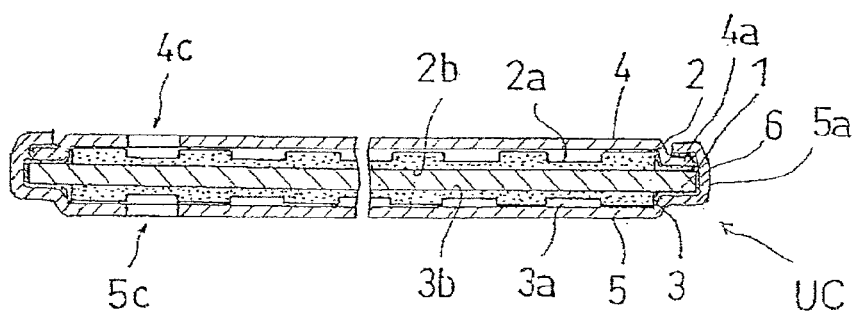

[FIG. 8]
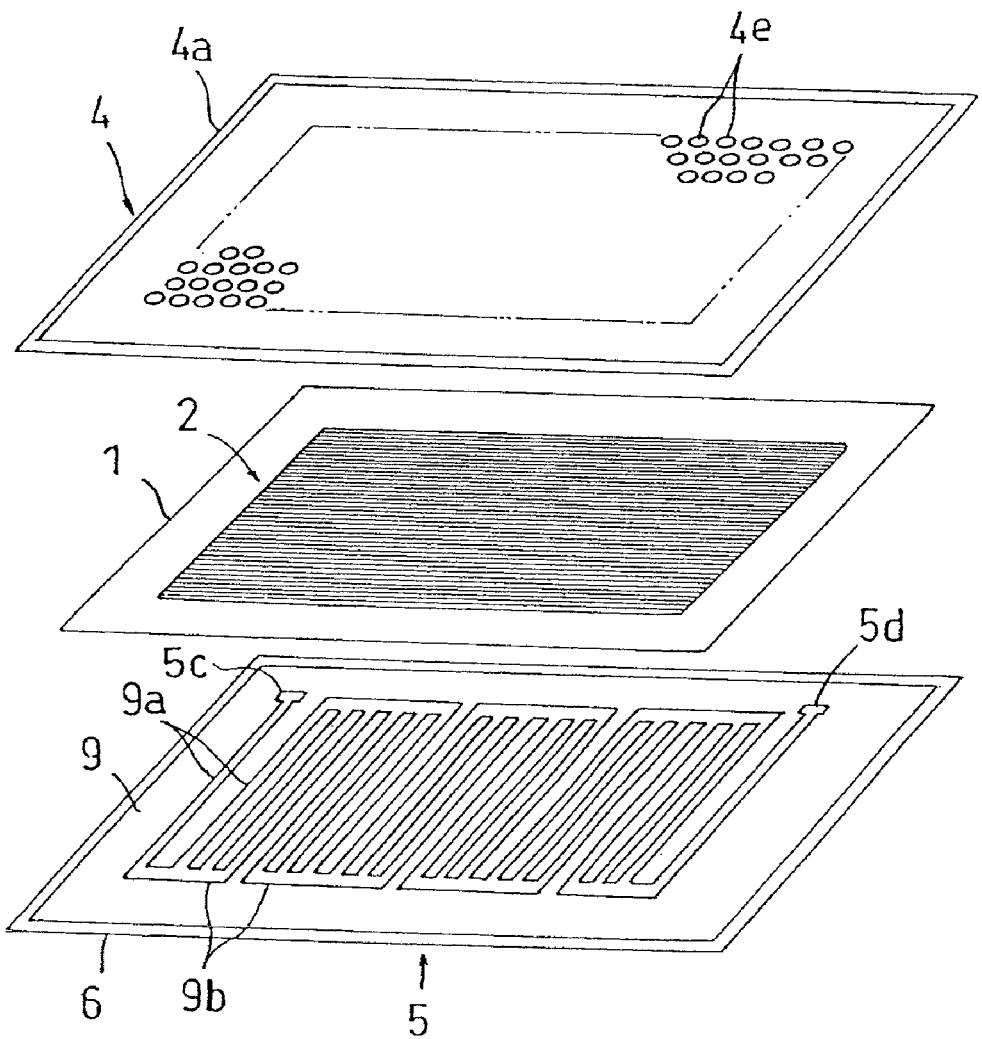
[FIG. 9]
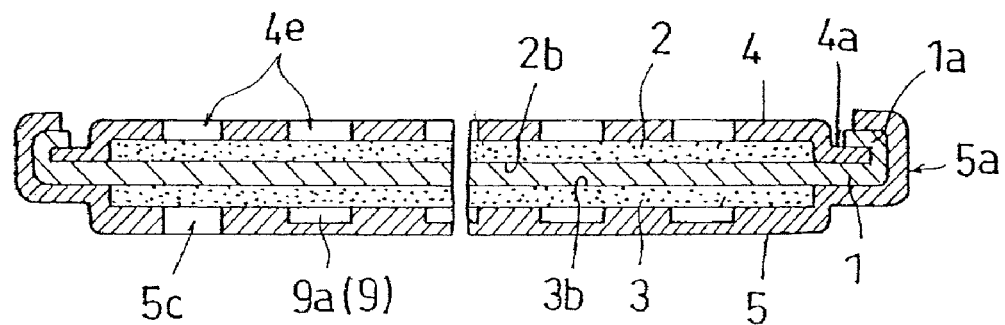

[FIG. 10]
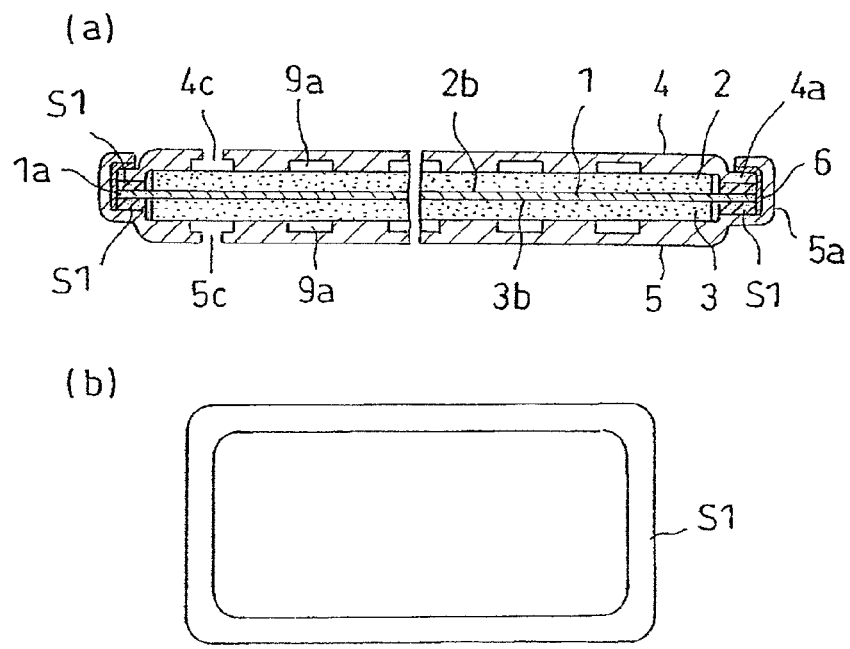
[FIG. 11]
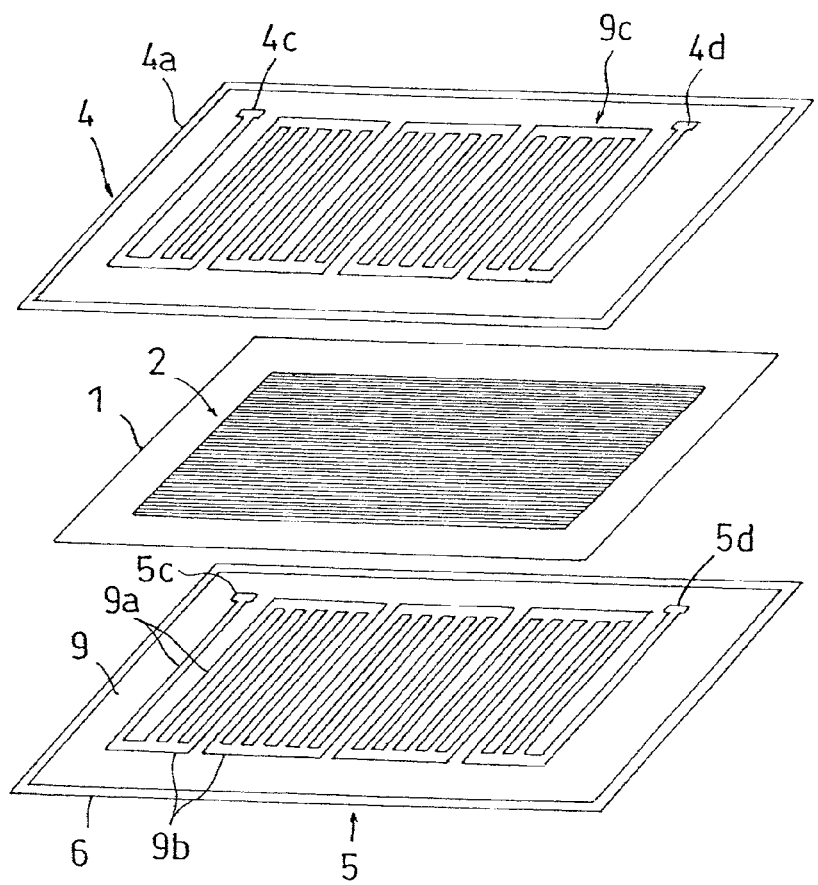

[FIG. 12]
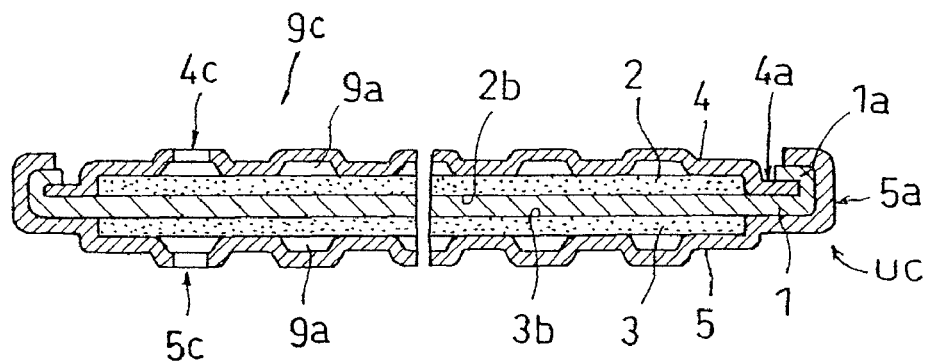
[FIG. 13]
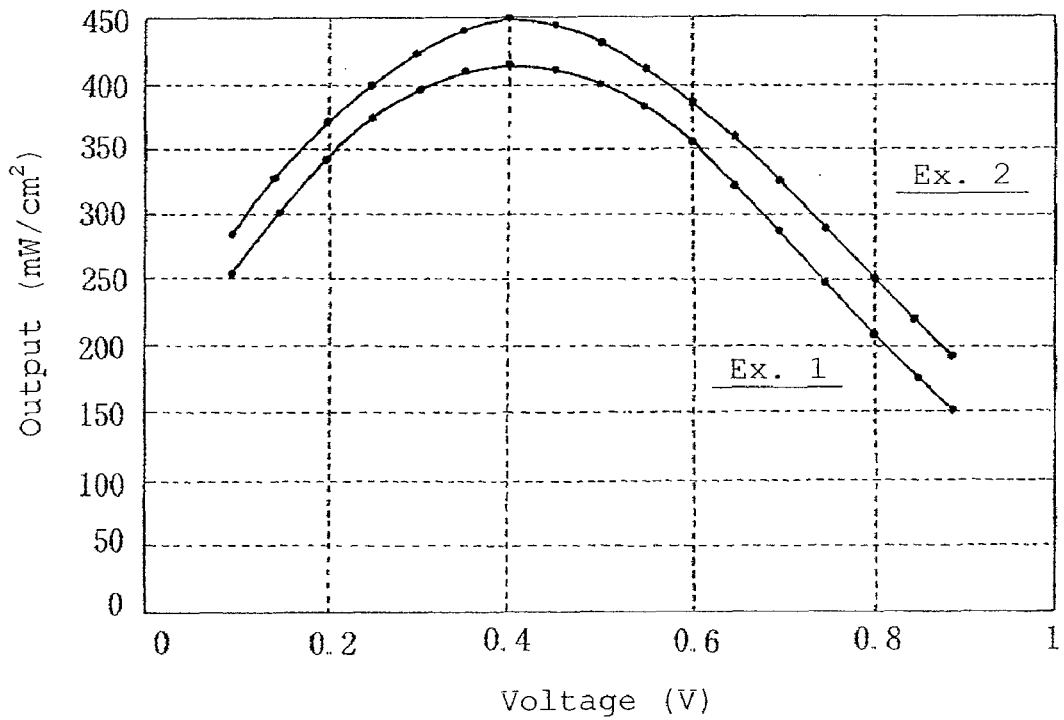

[FIG. 14]
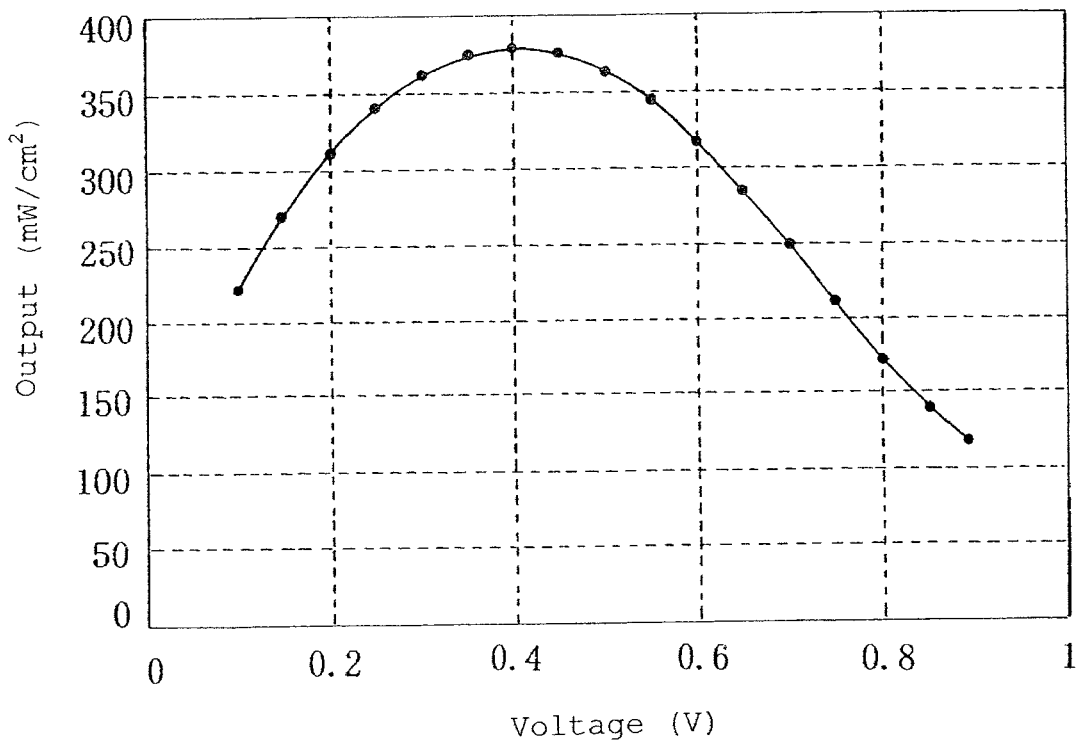

[FIG. 15]
(a)
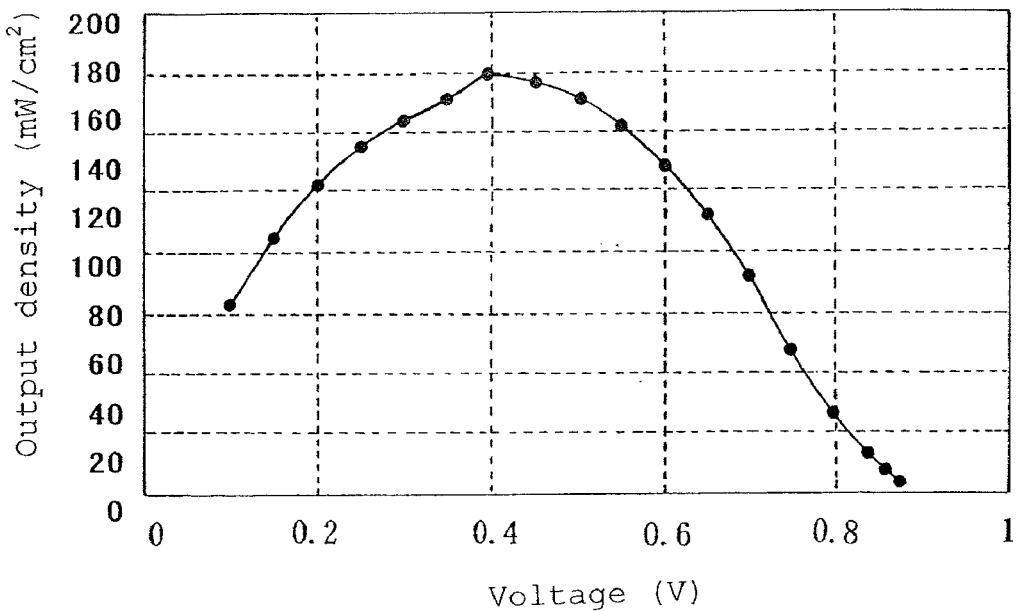
(b)
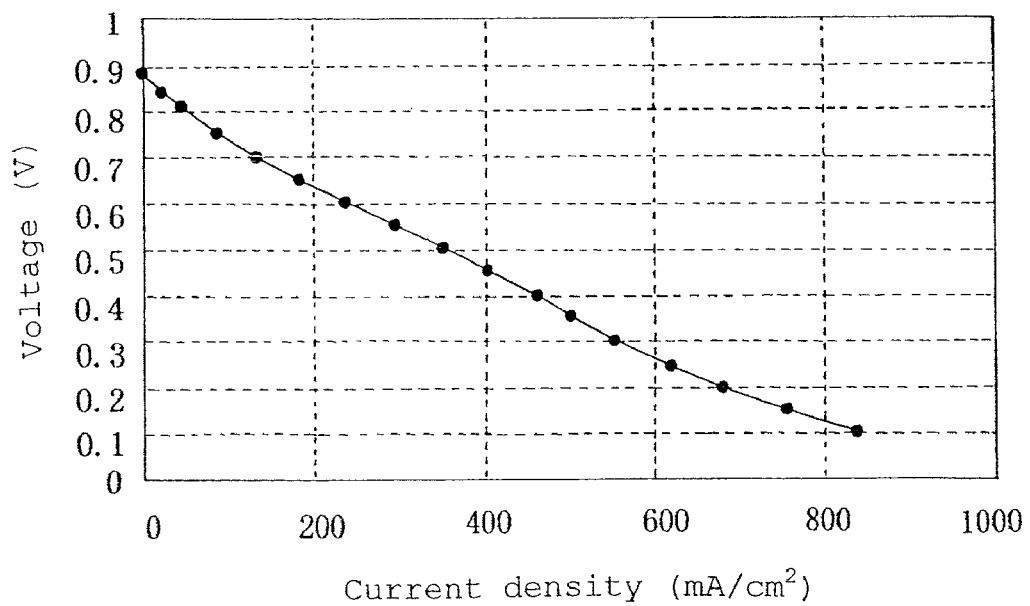

[FIG. 16]
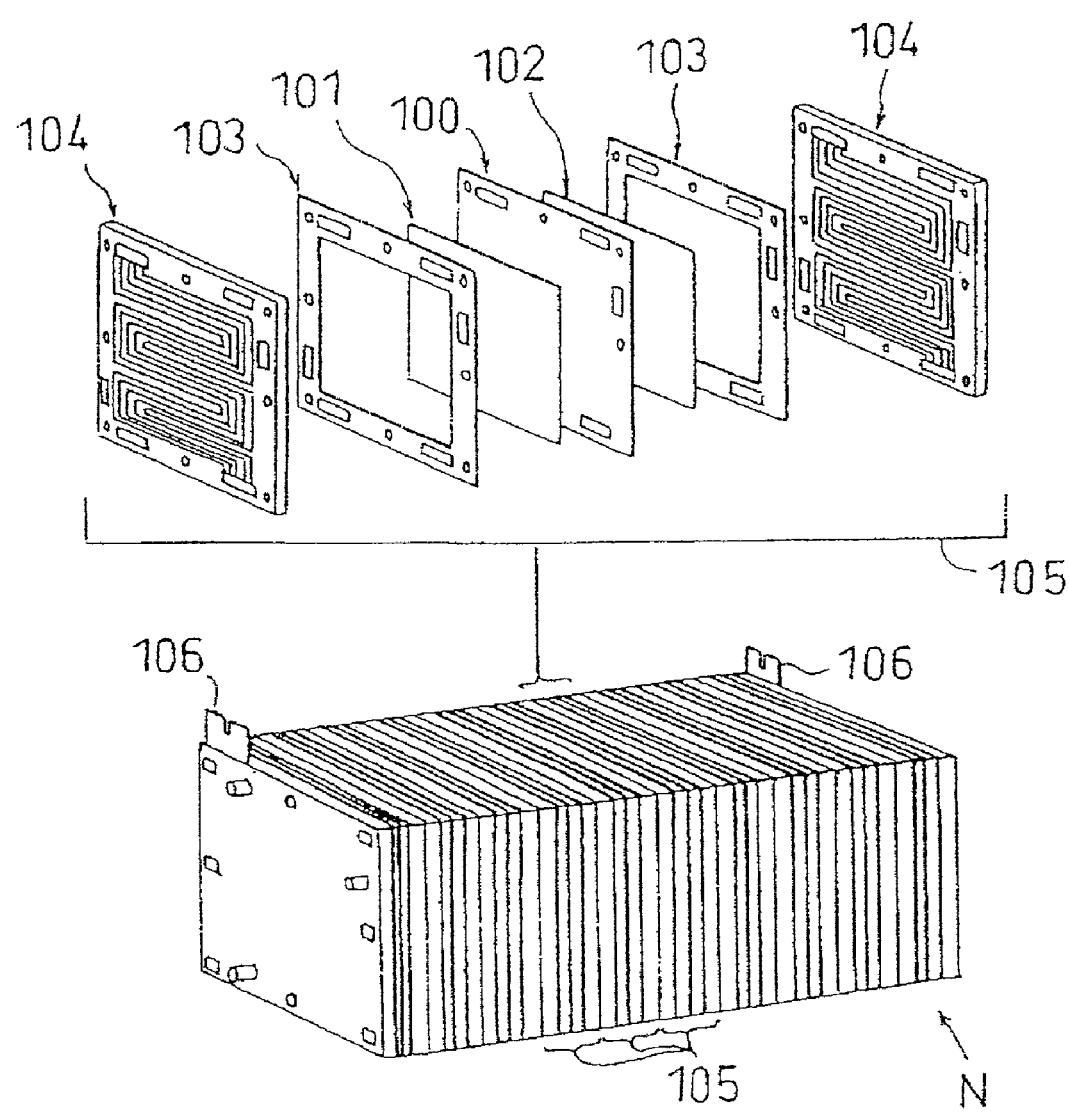

FUEL CELL

This application is the U.S. National Phase under 35 U.S.C. §371 of International Application PCT/JP2004/016953, filed Nov. 15, 2004, which claims priority to Japanese Patent Application No. 2003-389053, filed Nov. 19, 2003, No. 2003-389059, filed Nov. 19, 2003, No. 2004-035304, filed Feb. 12, 2004, No. 2004-118083, filed Apr. 13, 2004, and No. 2004-163116, filed Jun. 1, 2004. The International Application was not published under PCT Article 21(2) in English.

TECHNICAL FIELD

The present invention relates to a fuel cell using a solid polymer electrolyte, more particularly, it relates to a polymer-type fuel cell which can reduce a thickness.

BACKGROUND ART

Since a polymer-type fuel cell using a solid polymer electrolyte such as a polymer electrolyte has a high energy conversion efficiency, and is a thin and small type, and is light, it has been actively developed for a home cogeneration system and a motorcar. As a structure of the prior art of such the fuel cell, a structure shown in FIG. 16 is known (e.g. see Nikkei Mechanical supplement volume "Frontier of Fuel Cell Development" published on Jun. 29, in 2001, published by Nikkei BP, Chapter 3 PEFC, 3.1 Principles and Characteristics, p 46).

That is, as shown in FIG. 16, an anode 101 and a cathode 102 are disposed with holding a solid polymer electrolyte membrane 100. Further, a unit cell 105 is constructed by holding by one pair of separators 104 via a gasket 103. In each of separators 104, a gas flow path groove is formed and, by contact with an anode 101, a flow path for a reducing gas (e.g. hydrogen gas) is formed and, by contact with a cathode 102, a flow path for an oxidizing gas (e.g. oxygen gas) is formed. Each gas is supplied for an electrode reaction (chemical reaction at electrode) by the action of a catalyst carried in the interior of an anode 101 or a cathode 102 while passing through each flow path in a unit cell 105, and generation of an electric current and ionic conduction are made.

A fuel cell N is constructed by stacking a number of the unit cells 105, and electrically connecting unit cells 105 in series, and an electrode 106 can be taken out through stacked unit cells 105 on both ends. Such the fuel cell N is paid an attention in various utilities, particularly, as an electric motorcar supply or a distributed supply for household use, because of characteristics being clean and highly effective.

On the other hand, with activation of IT techniques in recent years, there is a tendency that mobile instruments such as a mobile phone, a notebook computer, and a digital camera are frequently used and, as an electric supply for them, a lithium ion secondary cell is used in most cases. However, with high functionalization of mobile instruments, a consumed power is gradually increased and, as an electric supply therefor, attention has focused on a fuel cell which is clean and highly effective.

However, in the prior structure as shown in FIG. 16, since a structure has no degree of freedom, it is difficult to realize a thinner, small and lighter type required as an electric supply for mobile instruments, and to make a high degree of freedom for a shape, and there is a problem of deteriorated maintenance. Further, it is difficult to supply respectively an oxidizing gas and a reducing gas in a fuel cell without mixing them, and to make a sealed structure, and it is difficult to reduce a size and a weight of a fuel cell while satisfying these conditions. In other words, conventionally, as cell parts have been interconnected with a securing part such as a bolt and a nut to apply a certain pressure to cell parts, it is necessary to enhance rigidity of each part in order to secure the sealing property, and thinning, miniaturization, weight reduction, and free shape design have been unavoidably difficult.

Meanwhile, the following Japanese Unexamined Patent Publication No. 58-176881 discloses a flat-type liquid fuel cell comprising a unit cell in which a liquid fuel is stored. The fuel cell has a structure in which a circumference of a laminate of a fuel electrode, an electrolyte, and an oxidizing agent electrode is integrated with a sealing material, and this is housed in a cell casing.

However, in the aforementioned cell structure, a force for pressing a sealing material to a side wall of a laminate containing an electrode cannot be sufficiently enhanced. Therefore, for example, when a hydrogen gas fuel is pressurized to flow on a fuel electrode side, a hydrogen gas is leaked to an oxidizing agent electrode side, and there is a problem that such as reduction in an electric generating efficiency and risk of hydrogen combustion. That is, an electrode of a fuel cell has generally a porous structure and, for this reason, the aforementioned cell structure is a structure in which a pressurized hydrogen gas passes through the interior of a fuel electrode, and is easily leaked to an oxidizing agent electrode side from between a side wall of an electrolyte and a sealing material.

DISCLOSURE OF THE INVENTION

Problems to be Solved by the Invention

Then, an object of the present invention is to provide a fuel cell in which sealing can be reliably made for each unit cell, thereby, enabling thinning, facilitating maintenance, and enabling miniaturization and weight reduction, and enabling free shape design.

Means to Solve the Problems

The above object can be attained by the following present invention.

That is, a fuel cell of the present invention is a fuel cell comprising a sheet-like solid polymer electrolyte, a cathode-side electrode plate arranged on one side of the solid polymer electrolyte, an anode-side electrode plate arranged on the other side, a cathode-side metal plate which is arranged on a surface of the cathode-side electrode plate and enables a gas to be flown to an internal side, and an anode-side metal plate which is arranged on a surface of the anode-side electrode plate and enables a fuel to be flown to an internal side, wherein a circumferential part of the solid polymer electrolyte is extended from the electrode plates on both sides, and circumferences of the metal plates on both sides are mechanically sealed in the state where they are electrically insulated, while the circumferential part is held by opposite parts of the metal plates. In the present invention, for example, a circumference of the metal plates on both sides is mechanically sealed with a bending press.

In accordance with the fuel cell of the present invention, since a circumferential part of a solid polymer electrolyte extends from electrode plates on both sides, and a circumference of a metal plate is mechanically sealed with a bending press or the like while the circumferential part is held with opposite metal plates, a sufficient pressing force is obtained between a circumferential part of a solid polymer electrolyte and a metal plate, therefore, a fuel gas can be prevented from leaking to a cathode side. In addition, since a circumference of a metal plate is sealed with a bending press in the state where it is electrically insulated, each unit cell can be reliably sealed without increasing a thickness to some extent, while short-circuit between both of them is prevented. By contacting an electrode plate and a metal plate, an electric current produced by an electrode reaction can be taken out from a metal plate. Moreover, since rigidity is not required in a cell part as compared with the previous art structure as shown in FIG. 6, each unit cell can be greatly thinned. Further, since a solid polymer electrolyte and a metal plate are used, a free planar shape and bending become possible, and size reduction, weight reduction and free shape design become possible.

In the present invention, particularly, it is preferable that a circumferential part of the solid polymer electrolyte is extended, and is exposed from a circumference of a sealed metal plate. According to this structure, since a solid polymer electrolyte intervenes also in a part sealed with a bending press, a sealed area is increased to enhance the sealing property and, at the same time, since a circumferential part is extended to expose from a sealed part, an oxidizing gas and a reducing gas are not mixed with each other at all.

BRIEF DESCRIPTION OF THE DRAWINGS

FIG. 1 is an assembling perspective showing one example of a unit cell of the fuel cell of the present invention.

FIG. 2 is a front cross-sectional view showing one example of a unit cell of the fuel cell of the present invention.

FIG. 3 is a view showing one example of the state of lamination of a cell unit of the fuel cell of the present invention. And, (*a*) is a perspective before attachment of a tube, and (*b*) is a main part front view after attachment of a tube.

FIG. 4 is a view showing an example of use of a unit cell of the fuel cell of the present invention. And, (*a*) is a left side view, and (*b*) is a cross-sectional view thereof seen along arrows I-I.

FIG. 5 is a front cross-sectional view showing another example of a unit cell of the fuel cell of the present invention.

FIG. 6 is an assembling perspective showing other example of a unit cell of the fuel cell of the present invention.

FIG. 7 is a front cross-sectional view showing other example of a unit cell of the fuel cell of the present invention.

FIG. 8 is an assembling perspective showing other example of a unit cell of the fuel cell of the present invention.

FIG. 9 is a front cross-sectional view showing other example of a unit cell of the fuel cell of the present invention.

FIG. 10 is a view showing other example of a unit cell of the fuel cell of the present invention. And, (*a*) is a front cross-sectional view, and (*b*) is a plane view showing a sealing member therefor.

FIG. 11 is an assembling perspective showing other example of a unit cell of the fuel cell of the present invention.

FIG. 12 is a front cross-sectional view showing other example of a unit cell of the fuel cell of the present invention.

FIG. 13 is a graph showing relationship between a voltage and an output of the fuel cell of the present invention obtained in Examples 1 to 2.

FIG. 14 is a graph showing a relationship between a voltage and an output of the fuel cell of the present invention obtained in Example 3.

FIG. 15 is a graph showing a relationship between a voltage and an output of the fuel cell of the present invention obtained in Example 4.

FIG. 16 is an assembling perspective showing one example of the prior art fuel cell.

EXPLANATION OF SYMBOLS

| | |
|---|---|
| 1 | solid polymer electrolyte |
| 1a | circumferential part |
| 2, 3 | electrode plate |
| 2a, 3a | flow path groove |
| 4, 5 | metal plate |
| 4c, 5c | inlet |
| 4d, 5d | outlet |
| 6 | insulating material |
| 9 | flow path groove |
| 9a | longitudinal groove |
| 9b | transverse groove |
| S1 | sealing member |

BEST MODE FOR CARRYING OUT THE INVENTION

Embodiments of the present invention will be explained below by referring to the drawings. FIG. 1 is an assembling perspective showing one example of a unit cell of the fuel cell of the present invention, and FIG. 2 is a front cross-sectional view showing one example of a unit cell of the fuel cell of the present invention.

The fuel cell of the present invention is provided with a sheet-like solid polymer electrolyte 1, and one pair of electrode plates 2, 3 arranged on both sides of the solid polymer electrolyte 1, as shown in FIG. 1 to FIG. 2. One pair of electrode plates 2, 3 consist of a cathode-side electrode plate 2 and an anode-side electrode plate 3.

As the solid polymer electrolyte 1, any solid polymer electrolytes can be used as far as they are used in the previous solid polymer membrane-type cells. From a viewpoint of chemical stability and electrical conductivity, a cationic exchange membrane comprising a perfluorocarbon polymer having a sulfonic acid group which is a superstrong acid is suitably used. As such the cationic exchange membrane, Nafion (registered trade mark) is suitably used.

In addition, for example, a porous membrane comprising a fluorine resin such as polytetrafluoroethylene etc. impregnated with the Nafion or other ion conducting substance, and a porous membrane and a non-woven fabric comprising a polyolefin resin such as polyethylene and polypropylene carrying the Nafion or other ion conducting substance may be used.

As a thickness of a solid polymer electrolyte 1 becomes smaller, this is effective for thinning of the whole. However, when the ion conducting function, a strength and the handling property are taken into consideration, 10 to 300 µm is usable, and 25 to 50 µm is preferable.

As electrode plates 2, 3, electrode plates exerting the function as a gas diffusing layer to perform supply and discharge of a fuel gas, an oxidizing gas and a water steam, and exerting the current collecting function can be used. As electrode plates 2, 3, the same or different plates can be used, and it is preferable that a catalyst having the electrode catalyzing action is carried in a substrate therefor. It is preferable that a catalyst is carried at least on inner surfaces 2*b*, 3*b* contacting with a solid polymer electrolyte 1.

As an electrode substrate, for example, fibrous carbon such as a carbon paper and a carbon fiber non-woven fabric, and an electrically conductive porous material such as an aggregate of electrically conductive polymer fibers can be used. Generally, electrode plates 2, 3 are manufactured by adding a water-repellent material such as a fluorine resin etc. to such the electrically conductive porous material. When a catalyst is carried, electrode plates are formed by mixing a catalyst such as platinum fine particles and a water-repellent material such as a fluorine resin etc., mixing a solvent with this to obtain a paste or an ink, and coating this on one side of an electrode substrate facing a solid polymer electrolyte membrane.

Generally, electrode plates 2, 3 and a solid polymer electrolyte 1 are designed depending on a reducing gas and an oxidizing gas which are supplied to a fuel cell. In the present invention, as an oxidizing gas, an oxygen gas and the air are used and, as a reducing gas, a hydrogen gas is used. Alternatively, in place of a reducing gas, methanol and dimethyl ether may be used.

For example, when a hydrogen gas and the air are used, since a reaction between an oxygen and a hydrogen ion occurs to produce water on an electrode on a side of air supply (air electrode), the electrode is preferably designed depending on such the electrode reaction. Particularly, under the operating condition of low working temperature, high current density and high gas utilizing rate, in particular, in an air electrode producing water, choking (flooding) phenomenon of an electrode porous body easily occurs due to condensation of a water steam. Therefore, in order to obtain the stable property of a fuel cell over a long period of time, it is effective to maintain the water-repellency of an electrode so as not to cause flooding phenomenon.

As a catalyst, at least one kind of metal selected from platinum, palladium, ruthenium, rhodium, silver, nickel, iron, copper, cobalt and molybdenum, or an oxide thereof can be used, and these catalysts which have been carried in carbon black or the like in advance may be used.

As a thickness of electrode plates 2, 3 becomes smaller, this is effective for thinning of the whole and, in view of an electrode reaction, a strength and the handling property, 50 to 500 μm is preferable.

Although electrode plates 2, 3 and a solid polymer electrolyte 1 may be laminated and integrated in advance by adhering, fusing or the like, they may be simply laminated and arranged. Such laminate may be obtained as a membrane electrode assembly (MEA), and this may be used.

One pair of metal plates 4, 5 are arranged on both sides of the electrode plates 2, 3. One pair of metal plates 4, 5 consist of a cathode-side metal plate 4 which is arranged on a surface of a cathode-side electrode plate 2 and enables a gas to be flown to an internal side, and an anode-side metal plate 5 which is arranged on a surface of an anode-side electrode plate 3 and enables a fuel to be flown to an internal side. In the present embodiment, metal plates 4, 5 are provided with a flow path groove 9, and inlets 4c, 5c and outlets 4d, 5d communicating therewith.

As metal plates 4, 5, any metal may be used as far as it does not adversely affect on an electrode reaction. However, from a viewpoint of an elongation, a weight, an elastic modulus, a strength, corrosion resistance, press processibility, and etching processibility, a stainless plate, and nickel are preferable.

A flow path groove 9 provided on metal plates 4, 5 may have any planar shape or cross-sectional shape as far as a flow path for a hydrogen gas or the like can be formed by contact with electrode plates 2, 3. However, in view of a flow path density, a lamination density at lamination, and bendability, it is preferable that a longitudinal groove 9a parallel with one side of metal plates 4, 5 and a transverse groove 9b perpendicular to one side of metal plates 4, 5 are mainly formed. In the present embodiment, a plurality of (3 in an example shown) longitudinal grooves 9a are connected in series with transverse grooves 9b, thereby, a flow path density and a flow path length are balanced.

A part (e.g. transverse groove 9b) of flow path grooves 9 of such the metal plates 4, 5 may be formed on an external surface of electrode plates 2, 3. As a method of forming flow path grooves 2a, 3a on an external side of electrode plates 2, 3, a mechanical method such as heat pressing and cutting may be used and, from a viewpoint of proper fine processing, it is preferable to perform groove processing by laser irradiation. Also from a viewpoint of laser irradiation, as a substrate for electrode plates 2, 3, an aggregate of fibrous carbon is preferable.

Single or a plurality of inlets 4c, 5c and outlets 4d, 5d communicating with flow path grooves 9 of metal plates 4, 5 may be formed. As a thickness of metal plates 4, 5 becomes smaller, this is effective for thinning of the whole and, in view of a strength, an elongation, a weight, an elastic modulus, and the handling property, 50 to 500 μm is preferable.

Examples of a method of forming flow path grooves 9 on metal plates 4, 5 include a mechanical method such as press processing and cutting, and a chemical method such as etching. In the present embodiment, an example is shown in which flow path grooves 9 are formed by deformation of a metal plate by press processing. By performing formation of grooves on metal plates 4, 5 by press processing, it becomes possible to manufacture metal plates 4, 5 advantageously in respect of the cost. In addition, in metal plates 4, 5 with grooves formed by press processing, increase in a thickness can be minimized, and it becomes possible not only to thin a fuel cell but also to reliably perform sealing every unit cell.

On an upper side of a metal plate 4 of FIG. 1, a convex part 9c of a flow path groove 9 with press processing is shown.

Particularly, in a flow path groove 9 with press processing, a width of 0.1 to 10 mm, and a depth of 0.1 to 10 mm is preferable. In addition, as a cross-sectional shape of a flow path groove 9, a general square, a general trapezoid, a general hemicircle, and a V-shape are preferable.

In the present invention, a circumferential part 1a of a solid polymer electrolyte 1 extends from the aforementioned electrode plates 4, 5 on both sides, and a circumference of the metal plates 4, 5 on both sides is mechanically sealed with holding the circumferential part 1a by opposite parts of the metal plates 4, 5, in the state where it is electrically insulated. Mechanical sealing can be performed, for example, by bending pressing, that is, so-called caulking. In the present embodiment, an example is shown in which a circumferential part 1a of a solid polymer electrolyte 1 is held by metal plates 4, 5 while an insulating material 6 intervenes and, at the same time, a circumference of metal plates 4, 5 is sealed by caulking while an insulating material 6 intervenes.

In the present invention, upon caulking, as shown in FIG. 2, a structure in which a solid polymer electrolyte 1 is held by circumferences of metal plates 4, 5 is preferable, and a structure in which a solid polymer electrolyte 1 is held while an insulating material 6 intervenes is more preferable. According to such the structure, flowing of a gas or the like from one of electrode plates 2, 3 into the other can be effectively prevented.

As an insulating material 6, a sheet-like resin, rubber, thermoplastic elastomer and ceramic can be used and, in order to enhance sealability, a resin, a rubber, and a thermoplastic elastomer are preferable. Alternatively, an insulating material 6 may be integrated with metal plates 4, 5 in advance by adhering to or coating on circumferences of metal plates 4, 5 directly or via a pressure-sensitive adhesive.

As a caulking structure, a structure shown in FIG. 2 is preferable from a viewpoint of sealability, easiness of manufacturing, and a thickness. That is, a caulking structure is preferable in which an external circumferential part 5a of one metal plate 5 is greater than an external circumferential part 4a of the other metal plate, an external circumferential part 5a of one metal plate 5 is turned up so as to holding-pressing an external circumferential part 4a of the other metal plate 4 while an insulating material 6 intervenes. In this caulking structure, it is preferable that a step is provided on an external circumferential part 4a of a metal plate 4 by press processing or the like. Such the caulking structure itself is known as metal processing, and can be formed by the known caulking apparatus.

In the present invention, single or a plurality of unit cells UCs as shown in FIG. 2 can be used, and it is preferable that a unit cell UC is constructed of a solid polymer electrolyte 1, one pair of electrode plates 2, 3, and one pair of metal plates 4, 5, and a plurality of the unit cells UCs are laminated. According to the present invention, a high output fuel cell can be provided without applying a certain pressure to cell parts by interconnection with a securing part of a bolt and a nut.

When a plurality of unit cells are laminated, although it is possible to laminate unit cells by providing a spacer capable of forming a flow path for a gas or the like between unit cells UCs, it is preferable to laminate unit cells via no spacer as shown in FIG. 3, from a viewpoint of thinning and a degree of freedom of design.

In addition, it is preferable that convex parts 9c of flow path grooves 9 of metal plates 4, 5 are formed parallel at equal intervals, and convex parts 9c of respective unit cells UCs are fit to each other. Thereby, a thickness at lamination of unit cells UCs can be further reduced.

In an embodiment shown in FIG. 3, an inlet 4c and an outlet 4d for a hydrogen gas or the like are provided around one side of a unit cell UC (metal plates 4, 5), an inlet 5c and an outlet 5d for the air or the like are provided on a back of opposing one side, and respective unit cells UCs are laminated by shifting them, so as to expose them. In this state, as shown in FIG. 3(b), by connecting a branch tube 12 of a tube 10 in which a branch tube 12 is branched from a main tube 11, to an inlet 4c, a hydrogen gas or the like can be injected. By connecting such the tube 10 to an inlet 5c, an outlet 4d, and an outlet 5d, it becomes possible to inject and discharge an oxidizing gas and a reducing gas.

On the other hand, by contacting metal plates, unit cells UCs are connected in series, and a current at a voltage depending on the lamination number can be taken out from unit cells UCs at both ends. Alternatively, a spacer is provided (not shown) every plural unit cells UCs, and a current may be taken out every unit cell UC.

In addition, when a unit cell is used, a tube for supplying a fuel can be directly connected to an inlet and an outlet of a metal plate for a fuel and, from a viewpoint of thinning of a fuel cell, it is preferable to provide a tube joint having a pipe which is small in a thickness and is parallel with a surface of a metal plate.

Since the fuel cell of the present invention can be reduced in a thickness, is a small type, is light, and can be freely designed with a shape, it can be suitably used, particularly, in mobile instruments such as a mobile phone, a notebook computer and the like.

In addition, when a current is take out, an embodiment as shown in FIG. 4(a) to (b) is possible. That is, the embodiment has a caulking structure in which an external circumferential part 5a of one metal plate 5 is greater than an external circumferential part 4a of the other metal plate, and the external circumferential part 5a of one metal plate 5 is turned up so as to holding-pressing the external circumferential part 4a of the other metal plate 4 and, at the same time, a surface of the other metal plate 4 and a surface of the turned up external circumferential part 5a are used as an current taking out part (e.g. cathode and anode). In that case, as shown in the figure, it is preferable that a surface of the other metal plate 4 and a surface (upper side in the figure) of the turned up external circumferential part 5a are at the same level or approximately the same level. Thereby, contact between a current taking out part and a contact point terminal on a cell holder side can be more preferably performed.

In addition, in the embodiment shown in FIG. 4(a) to (b), by contacting plate spring contact point terminals 21, 22 fixed on an apparatus body side of electronic instruments with a current taking out part of a cell, a current can be taken out with lead wires 23, 24.

Any current taking out form can be used, a straight wire or a lead wire can be connected to a cell with a solder, and a connector can be provided on a cell.

Other Embodiment

Other embodiment of the present invention will be explained below.

(1) The aforementioned embodiment showed an example in which a flow path groove formed by press processing, and an inlet and a outlet communicating the flow path groove are provided on a metal plate. In the present invention, as shown in FIG. 5, it is preferable that a flow path groove 9 formed by etching, and inlets 4c, 5c and outlets 4d, 5d communicating with the flow path groove 9 are provided on metal plates 4, 5. By forming grooves on metal plates 4, 5 by etching, it becomes possible to easily form grooves also on a metal plate having high rigidity and, due to the rigidity, it becomes easy to apply a pressure to a membrane electrode assembly, gas leakage can be reduced, and a high output (see FIG. 13) can be obtained.

In a flow path groove 9 by etching, a width of 0.1 to 10 mm, and a depth of 0.05 to 1 mm are preferable. In addition, as a cross-sectional shape of a flow path groove 9, a general square, a general trapezoid, a general hemicircle, and a V-shape are preferable.

Etching can be performed using an etchant depending on a kind of metal plates 4, 5 after an etching resist having a predetermined shape is formed on a metal surface, for example, using a dry film resist. In addition, by selectively performing etching every metal using a laminated plate of two or more kinds of metals, a cross-sectional shape of a flow path groove 9 can be controlled at a higher precision. In addition, inlets 4c, 5c and outlets 4d, 5d communicating with a flow path groove 9 can be also formed by etching.

An embodiment shown in FIG. 5 is an example in which a thickness of SUS at a caulking part 4a and 5a of metal plates 4, 5, respectively is reduced. Like this, by etching a caulking part to a suitable thickness, sealing by caulking can be performed more easily. From this point of view, a thickness of a caulking part is preferably 0.05 to 0.3 mm.

(2) The aforementioned embodiment showed an example in which a flow path groove for a fuel or the like is formed on a metal plate arranged on a surface of an electrode plate. In the present invention, as shown in FIG. 6 to FIG. 7, flow path grooves 2a, 3a for a fuel or the like may be formed on a side of electrode plates 2, 3. Moreover, it is preferable that flow path grooves 2a, 3a are formed on an external surface of a cathode-side electrode plate 2 and/or an anode-side electrode plate 3 and, at the same time, inlets 4c, 5c and outlets 4d, 5d communicating with the flow path grooves 2a, 3a are provided on metal plates 4, 5 arranged on a surface thereof.

As a method of forming flow path grooves 2a, 3a on an external surface of electrode plates 2, 3, a mechanical method such as heat pressing and cutting may be used and, from a viewpoint of suitable fine processing, it is preferable to perform groove processing by laser irradiation. From a viewpoint of laser irradiation, as a substrate for electrode plates 2, 3, an aggregate of fibrous carbon is preferable.

As a thickness of electrode plates 2, 3 is smaller, this is effective for thinning of the whole. In view of an electrode reaction, a strength, and the handling property, 50 to 500 μm is usable, and 200 to 350 μm is preferable. In addition, as a depth of flow path grooves 2a, 3a, 100 to 500 μm is preferable in order to secure a sufficient flow path.

In this embodiment, electrode plates 2, 3 are preferably such that a catalyst is carried on at least one side of an aggregate of fibrous carbon, and a flow path groove from which the fibrous carbon has been removed by laser irradiation, is formed on the other surface.

Like this, by using an aggregate of fibrous carbon as an electrode material, diffusivity of a gas and current collecting efficiency become better, and an electrode reaction can be promoted by a carried catalyst. In addition, since fibrous carbon can be subjected to fine processing by a method such as laser irradiation, and a flow path groove from which fibrous carbon has been removed is formed, a fine gas flow path can be formed while gas diffusivity is maintained, as compared with an electrode plate obtained by press processing.

(3) The aforementioned embodiment showed an example in which a flow path groove for a gas such as the air etc. is formed on a metal plate on a cathode side, or an electrode plate. In the present invention, it is also possible to omit a flow path groove on a cathode side. That is, if necessary, a flow path groove, an inlet and a outlet for a fuel or a gas, and an opening part can be provided on metal plates 4, 5. For example, the air can be naturally supplied through an opening part, or a outlet for a fuel gas can be also omitted.

For example, as shown in FIG. 8 to FIG. 9, an opening part 4e for supplying oxygen in the air may be provided on a metal plate 4 on a cathode side without providing a flow path groove. An opening part 4e may have any number, shape, size and formation position as far as a cathode-side electrode plate 2 can be exposed. However, in view of an efficiency of supplying oxygen in the air, and the effect of collecting a current from a cathode-side electrode plate 2, an area of an opening part 4e is preferably 10 to 50%, particularly preferably 20 to 40% an area of a cathode-side electrode plate 2. In an opening part 4c of a cathode-side metal plate 4, for example, a plurality of circular pores or slits may be provided regularly or randomly, or an opening part may be provided with a metal mesh.

Since a caulking structure is the same as that of FIG. 2, explanation will be repeated here. A construction of a flow path of an anode-side metal plate 5 is the same as that shown in FIGS. 1 to 2.

(4) The aforementioned embodiment showed an example in which a circumferential part 1a of a solid polymer electrolyte 1 is held by metal plates 4, 5 while an insulating material 6 intervenes, as shown in FIG. 2. In the present invention, a structure in which a circumferential part 1a is directly held by metal plates 4, 5 may be used. Alternatively, a sealing member may intervene between both of them. In particular, when a thickness of a solid polymer electrolyte is smaller, by holding a sealing member by metal plates on both sides like this, mixing and leakage of fluids (e.g. fuel gas and oxidizing gas) on both sides of a solid polymer electrolyte can be effectively prevented.

When a sealing member intervenes, a sealing member S1 may intervene in the form shown in FIG. 10(a) to (b). In this embodiment, a circumferential part 1a of a solid polymer electrolyte 1 is held by metal plates 4, 5 on both sides via an annular sealing member S1. Thereupon, it is particularly preferable to hold with external circumferential parts 4a, 5a of metal plates 4, 5 from a viewpoint of improvement in the sealability due to enhanced holding pressure.

As shown in FIG. 10(b), an annular sealing member S1 has an annular shape along a circumferential part 1a of a solid polymer electrolyte 1 and, in context with a caulking structure, four corners of an external circumference have a round shape. A sealing member S1 may simply exert holding, or may be adhered to a circumference of metal plates 4, 5 or a solid polymer electrolyte 1 directly or via a pressure-sensitive adhesive.

A thickness of an annular sealing member S1 depends on a thickness of a solid polymer electrolyte 1, and is preferably 20 to 200 μm. In addition, as a material for a sealing member S1, a material having elasticity is preferable, and a resin such as a silicone-based resin and a fluorine-based resin, a rubber, and a thermoplastic elastomer are preferable.

(5) The aforementioned embodiment showed an example in which a circumferential part of a solid polymer electrolyte is not exposed from a circumference of a sealed metal plate. In the present invention, as shown in FIG. 11 to FIG. 12, a circumferential part 1a of a solid polymer electrolyte 1 may be extended to be exposed from a circumference of sealed metal plates 4, 5. In this case, an insulating material may be separately provided as in the aforementioned embodiment, but short-circuit between metal plates 4, 5 can be prevented only by a solid polymer electrolyte 1 without providing an insulating material.

EXAMPLES

The present invention will be explained below by way of Examples, but the present invention is not limited to these Examples at all.

Example 1

Twenty one grooves (width 0.8 mm, depth 0.2 mm, interval 1.6 mm) were provided on SUS (50 mm×26 mm×0.08 mm thickness) having corrosion resistance by press processing. An insulating sheet (50 mm×26 mm×2 mm width, thickness 80 μm) was then laminated to SUS. A membrane electrode assembly (49.3 mm×25.3 mm) was manufactured as described below. As a platinum catalyst, a carbon catalyst carrying 20% platinum (EC-20-PTC) manufactured by US Electrochem was used. This platinum catalyst, carbon black (Akzo; Ketchen Black EC) and polyvinylidene fluoride (Kiner) were mixed at a ratio of 75% by weight, 15% by weight, and 10% by weight, dimethylformamide was added to the mixture of a platinum catalyst, carbon black and polyvinylidene fluoride at such a ratio that a 2.5 weight % polyvinylidene fluoride solution was obtained, and the materials were dissolved and mixed in a mortar to prepare a catalyst paste. A carbon paper (TGP-H-90 manufactured by Toray Industries, Inc., thickness 370 μm) was cut into 20 mm×43 mm, about 20 mg of the above-prepared catalyst paste was coated thereon with a spatula, and this was dried in a hot air circulating dryer at 80° C. In this way, a carbon paper carrying 4 mg of a catalyst composition was prepared. An amount of platinum to be carried is 0.6 mg/cm$^2$.

Using the above-prepared platinum catalyst-carrying carbon paper, and a Nafion film (Nafion 112 manufactured by Du Pont Kabushiki Kaisha) (25.3 mm×49.3 mm, thickness 50 µm) as a solid polymer electrolyte (cation exchange membrane), both sides thereof were hot pressed using a mold for 2 minutes under the condition of 135° C. and 2 MPa. The thus obtained membrane electrode assembly was held by two of the SUS plates at a center thereof, and this was caulked as shown in FIG. 2, thereby, a thin miniature micro-fuel cell having external dimension 50 mm×26 mm×1.4 mm thickness could be obtained.

This micro-fuel cell was assessed for cell properties. The fuel cell properties were assessed using a pure hydrogen gas and a pure oxygen gas at room temperature employing a fuel cell assessing system manufactured by TOYO Corporation. A gas flow rate was 0.2 L/min. The resulting maximum output density was 400 mW/cm$^2$ per electrode area (FIG. 13). By laminating six fuel cells to form series connection, an output of 18 W as a fuel cell was obtained. The feature of the present invention is in that a cell is thin as a thickness of 1.4 mm, and a high output as 400 mW/cm$^2$ per unit electrode area is obtained.

Example 2

According to the same manner as that of Example 1 except that SUS (50 mm×26 mm×0.3 mm thickness) having a different thickness was used, and a groove (width 0.8 mm, depth 0.2 mm, interval 1.6 mm) was formed by changing a processing method to etching with an aqueous ferric chloride solution, a thin miniature micro-fuel cell shown in FIG. 4 was obtained. In FIG. 4, a thickness of SUS at a caulking part was also reduced by etching (thickness 0.1 mm).

Cell properties of this micro-fuel cell were assessed as in Example 1. The resulting maximum output density was 450 mW/cm$^2$ per electrode area (FIG. 13). Six fuel cells were laminated to obtain series connection, and output of 20 W as a fuel cell was obtained. The feature of the present invention is in that a cell is thin as a thickness of 1.4 mm, and a high output as 450 mW/cm$^2$ per unit electrode area is obtained.

Reference Example 1

According to the same manner as that of Example 2 except that a thickness of a solid polymer electrolyte was 25 µm (½ of that of Example 2), a fuel cell was prepared. At that time, the presence or the absence of gas mixing in a cell and the presence or the absence of gas leakage to the outside of a cell were investigated in the case where a sealing member (material: fluorine resin, thickness 100 µm) having a shape shown in FIG. 10(b) was used, or not used.

As a result, when a sealing member was used, gas mixing and gas leakage did not occur at a ratio of 10/10, on contrast, when a sealing member was not used, gas mixing occurred at a ratio of 4/10, and gas leakage occurred at a ratio of 3/10.

Example 3

Using SUS (50 mm×26 mm×0.08 mm thickness) having corrosion resistance, an insulating seat (50 mm×26 mm×2 mm width, thickness 70 µm) was laminated on the SUS. A membrane electrode assembly (49.3 mm×25.3 mm) was prepared as described below. As a platinum catalyst, a 20% platinum-carrying carbon catalyst (EC-20-PTC) manufactured by US Electrochem was used. This platinum catalyst, carbon black (Akzo; Ketchen Black EC) and polyvinylidene fluoride (Kiner) were mixed at a ratio of 75% by weight, 15% by weight, and 10% by weight, dimethylformamide was added to the mixture of a platinum catalyst, carbon black and polyvinylidene fluoride at such a ratio that a 2.5 weight % polyvinylidene fluoride solution was obtained, and the materials were dissolved and mixed in a mortar to prepare a catalyst paste. A carbon paper (TGP-H-90 manufactured by Toray Industries, Inc., thickness 370 µm) was cut into 20 mm×43 mm, about 20 mg of the above-prepared catalyst paste was coated thereon with a spatula, and this was dried in a hot air circulating dryer at 80° C. In this way, a carbon paper carrying 4 mg of a catalyst composition was prepared. An amount of platinum to be carried is 0.6 mg/cm$^2$.

A side opposite to a catalyst layer of the above-prepared platinum catalyst-carrying carbon paper was subjected to groove processing (width: 2.3 mm, depth: 0.2 mm, interval: 2.3 mm) using semiconductor laser. Then, using a Nafion film (Nafion 112 manufactured by Du Pont Kabushiki Kaisha) (25.3 mm×49.3 mm, thickness 50 µm) as a solid polymer electrolyte (cation exchange membrane), both sides thereof were hot pressed using a mold for 2 minutes under the condition of 135° C. and 2 MPa. The thus obtained membrane electrode assembly was held by two of the SUS plates at a center thereof, and this was caulked as shown in FIG. 7, thereby, a thin miniature micro-fuel cell having external dimension 50 mm×26 mm×1.0 mm thickness could be obtained.

This micro-fuel cell was assessed for cell properties. The fuel cell properties were assessed using a pure hydrogen gas and a pure oxygen gas at room temperature employing a fuel cell assessing system manufactured by TOYO Corporation. A gas flow rate was 0.2 L/min. The resulting maximum output density was 380 mW/cm$^2$ per electrode area (FIG. 14). Then, by laminating six fuel cells to form series connection, an output of 17.5 W as a fuel cell was obtained. The feature of the present invention is in that a cell is thin as a thickness of 1.0 mm, and a high output as 380 mW/cm$^2$ per unit electrode area is obtained and, since an end plate is planar, lamination is easy, and series connection is possible.

Example 4

Twenty one grooves (width 0.8 mm, depth 0.2 mm, interval 1.6 mm) were provided on SUS (50 mm×26 mm×0.08 mm thickness) having corrosion resistance by press processing. A membrane electrode assembly (52.3 mm×28.3 mm) was manufactured as described below. As a platinum catalyst, a carbon catalyst carrying 20% platinum (EC-20-PTC) manufactured by US Electrochem was used. This platinum catalyst, carbon black (Akzo; Ketchen Black EC) and polyvinylidene fluoride (Kiner) were mixed at a ratio of 75% by weight, 15% by weight, and 10% by weight, dimethylformamide was added to the mixture of a platinum catalyst, carbon black and polyvinylidene fluoride at such a ratio that a 2.5 weight % polyvinylidene fluoride solution was obtained, and the materials were dissolved and mixed in a mortar to prepare a catalyst paste. A carbon paper (TGP-H-90 manufactured by Toray Industries, Inc., thickness 370 µm) was cut into 20 mm×43 mm, about 20 mg of the above-prepared catalyst paste was coated thereon with a spatula, and this was dried in a hot air circulating dryer at 80° C. In this way, a carbon paper carrying 4 mg of a catalyst composition was prepared. An amount of platinum to be carried is 0.6 mg/cm$^2$.

Using the above-prepared platinum catalyst-carrying carbon paper, and a Nafion film (Nafion 112 manufactured by Du Pont Kabushiki Kaisha) (52.3 mm×28.3 mm, thickness 25

μm) as a solid polymer electrolyte (cation exchange membrane), both sides thereof were hot pressed using a mold for 2 minutes under the condition of 135° C. and 2 MPa. The thus obtained membrane electrode assembly was held by two of the SUS plates at a center thereof, and this was caulked as shown in FIG. 12, thereby, a thin miniature micro-fuel cell having external dimension 50 mm×26 mm×1.4 mm thickness could be obtained.

This micro-fuel cell was assessed for cell properties. The fuel cell properties were assessed using a pure hydrogen gas and the air at room temperature employing a fuel cell assessing system manufactured by TOYO Corporation. A hydrogen gas flow rate was 0.1 L/min. An air flow rate was 0.2 L/min. And, the output property per unit cell is shown in FIG. 15. By utilizing a caulking structure in accordance with the present invention, the property which can be sufficiently put into practice was obtained.

The invention claimed is:

1. A fuel cell comprising a sheet-like solid polymer electrolyte, a cathode-side electrode plate arranged on one side of the solid polymer electrolyte, an anode-side electrode plate arranged on the other side, a cathode-side metal plate which is arranged on a surface of the cathode-side electrode plate and enables a gas to be flown to an internal side, and an anode-side metal plate which is arranged on a surface of the anode-side electrode plate and enables a fuel to be flown to an internal side,
   wherein a circumferential part of the solid polymer electrolyte is extended from the electrode plates on both sides, and circumferences of the metal plates on both sides are mechanically sealed by bending press in the state where they are electrically insulated, while the circumferential part is held by opposite parts of the metal plates,
   wherein the fuel cell has a structure in an external circumferential part of one metal plate is greater in width than an external circumferential part of the other metal plate, and an external circumferential part of the one metal plate is turned up so as to holding-press an external circumferential part of the other metal plate, so that the circumferential part of the solid polymer electrolyte is pressed by the opposite parts of the metal plates.

2. The fuel cell according to claim 1, wherein a flow path groove is formed by press processing, and an inlet and an outlet communicating with the flow path groove are provided on the anode-side metal plate.

3. The fuel cell according to claim 1, wherein a flow path groove is formed by etching, and an inlet and an outlet communicating with the flow path groove are provided on the anode-side metal plate.

4. The fuel cell according to claim 1, wherein a flow path groove is formed on an external surface of the cathode-side electrode plate and/or the anode-side electrode plate and, an inlet and an outlet communicating with the flow path groove are provided on the metal plate arranged on a surface thereof.

5. The fuel cell according to claim 4, wherein the cathode-side electrode plate and/or the anode-side electrode plate is such that a catalyst is carried on at least one side of an aggregate of fibrous carbon, and a flow path groove in which the fibrous carbon has been removed by laser irradiation is formed on the other side.

6. The fuel cell according to claim 1, wherein the circumferential part of the solid polymer electrolyte is extended to be exposed from a circumference of a sealed metal plate.

7. The fuel cell according to claim 6, wherein an insulating material is further interposed between a circumference of the metal plate and a circumferential part of the solid polymer electrolyte.

8. The fuel cell according to claim 1, wherein a thickness of a circumferential part of at least one of the anode-side metal plate and the cathode-side metal plate is made smaller by etching than a thickness of a part of the respective anode-side metal plate or cathode-side metal plate contacting the solid polymer electrolyte.

9. The fuel cell according to claim 1, wherein an opening part for supplying oxygen-containing air is provided on the cathode-side metal plate.

10. The fuel plate according to claim 1, wherein a circumferential part of the solid polymer electrolyte is held by metal plates on both sides via an annular sealing member.

11. The fuel cell according to claim 1, wherein a surface of the other metal plate and a surface of the turned up external circumferential part are used as a current taking out part.

12. A fuel cell comprising:
   a sheet-shaped solid polymer electrolyte;
   a cathode-side electrode plate arranged on one side of the solid polymer electrolyte;
   an anode-side electrode plate arranged on the other side of the solid polymer electrolyte;
   a cathode-side metal plate arranged on a surface of the cathode-side electrode plate opposite to the solid polymer electrolyte, wherein a gas flow channel for passing a gas therethrough is formed between the cathode-side metal plate and the cathode-side electrode plate; and
   an anode-side metal plate arranged on a surface of the anode-side electrode plate opposite to the solid polymer electrolyte, wherein a fuel flow channel for passing a fuel therethrough is formed between the anode-side metal plate and the anode-side electrode plate,
   wherein a parameter of the solid polymer electrolyte protrudes from the electrode plates sandwiching the solid polymer electrolyte,
   the metal plates comprise circumferential parts extending to and sandwiching the protruding part of the parameter of the solid polymer electrolyte, wherein a circumferential part of one of the cathode-side electrode plate or anode-side electrode plate extends beyond the circumferential part of the other electrode plate, and
   parameters of the metal plates are mechanically sealed by bending press and electrically insulated from each other.

13. The fuel cell according to claim 12, wherein the cathode-side metal plate has an inlet opening for introducing the gas into the gas flow channel and an outlet opening for discharging the gas from the gas flow channel.

14. The fuel cell according to claim 12, wherein the anode-side metal plate has an inlet opening for introducing the fuel into the fuel flow channel and an outlet opening for discharging the fuel from the fuel flow channel.

15. A method of producing a fuel cell comprising:
   providing a structure comprising a sheet-shaped solid polymer electrolyte sandwiched by a cathode-side electrode plate and an anode-side electrode plate, wherein a parameter of the solid polymer electrolyte protrudes from the electrode plates sandwiching the solid polymer electrolyte;
   placing a cathode-side metal plate on a surface of the cathode-side electrode plate, wherein a gas flow channel for passing a gas therethrough is formed between the cathode-side metal plate and the cathode-side electrode plate;

placing an anode-side metal plate on a surface of the anode-side electrode plate, wherein a fuel flow channel for passing a fuel therethrough is formed between the anode-side metal plate and the anode-side electrode plate, wherein the metal plates comprise circumferential parts extending to and sandwiching the protruding part of the parameter of the solid polymer electrolyte, wherein a circumferential part of one of the cathode-side electrode plate or anode-side electrode plate extends beyond the circumferential part of the other electrode, and mechanically sealing parameters of the metal plates by bending press wherein the metal plates are electrically insulated from each other.

16. The method according to claim 15, wherein the fuel flow channel is formed as a groove by press processing the anode-side metal plate.

17. The method according to claim 15, wherein the fuel flow channel is formed as groove by etching the anode-side metal plate.

18. The method according to claim 15, wherein the cathode-side electrode plate is made of an aggregate of fibrous carbon wherein a catalyst is placed on one side of the aggregate of fibrous carbon, and the gas flow channel is formed on the other side as a groove by removing a part of the aggregate of fibrous carbon by laser irradiation on the other side.

19. The method according to claim 15, wherein the anode-side electrode plate is made of an aggregate of fibrous carbon wherein a catalyst is placed on one side of the aggregate of fibrous carbon, and the fuel flow channel is formed on the other side as a groove by removing a part of the aggregate of fibrous carbon by laser irradiation on the other side.

* * * * *

UNITED STATES PATENT AND TRADEMARK OFFICE
CERTIFICATE OF CORRECTION

| | | |
|---|---|---|
| PATENT NO. | : 7,862,954 B2 | Page 1 of 1 |
| APPLICATION NO. | : 10/595748 | |
| DATED | : January 4, 2011 | |
| INVENTOR(S) | : Masaya Yano et al. | |

It is certified that error appears in the above-identified patent and that said Letters Patent is hereby corrected as shown below:

Column 8, line 55, delete "respectively" and insert --respectively,-- thereof.

Column 13, line 37, In Claim 1, delete "in" and insert --in which-- thereof.

Column 15, line 10, In Claim 15, delete "electrode," and insert --electrode plate,-- thereof.

Signed and Sealed this
Thirteenth Day of September, 2011

David J. Kappos
*Director of the United States Patent and Trademark Office*